United States Patent
Pickering

[11] Patent Number: 6,164,675
[45] Date of Patent: Dec. 26, 2000

[54] FRONT SUSPENSION FOR A MOTORIZED TRIKE

[76] Inventor: Gregory Lee Pickering, 26162 Via De Toledo, San Juan Capistrano, Calif. 92675

[21] Appl. No.: 09/062,545

[22] Filed: Apr. 17, 1998

Related U.S. Application Data

[60] Provisional application No. 60/044,745, Apr. 18, 1997.

[51] Int. Cl.[7] ................................................. B62K 21/04
[52] U.S. Cl. ........................................... 280/277; 180/219
[58] Field of Search .................................. 280/276, 277, 280/279; 180/219

[56] References Cited

U.S. PATENT DOCUMENTS

| | | | |
|---|---|---|---|
| 1,189,874 | 7/1916 | Schickel . | |
| 1,527,133 | 2/1925 | Harley . | |
| 4,775,163 | 10/1988 | McGowan et al. | 280/277 |
| 5,026,083 | 6/1991 | Wendorf | 280/277 |
| 5,603,521 | 2/1997 | Bontrager | 280/279 |
| 5,829,773 | 11/1998 | Rajaee | 280/276 |
| 5,855,388 | 1/1999 | Brewer | 280/288.4 |

OTHER PUBLICATIONS

SOFTAIL® 2–page brochure, *1997 Harley–Davidson Genuine Motor Accessories and Genuine Motor Parts*.

*Primary Examiner*—Kevin Hurley
*Attorney, Agent, or Firm*—Christie, Parker & Hale, LLP

[57] ABSTRACT

A front suspension for a motorcycle or motorized trike which is capable of supporting increased dynamic loads while maintaining the conventional motorcycle styling and ride characteristics. The front suspension includes a pair of spaced-apart and generally parallel rear forks, each of which extends between an upper bracket and a rocker arm. A lower bracket also supports the rear forks. The upper and lower brackets are each adapted for pivotal connection with the frame. Each rocker arm is pivotally coupled to a rear fork and extending forwardly to an axle bore. A pair of spaced apart and generally parallel front forks is also pivotally attached to each rocker arm. The front forks extend upwardly and are generally parallel to the rear forks. The front forks are movable relative to the rear forks in response to pivotal movement of the rocker arms. Opposing springs are mounted about each front forks so that fork movement is restrained by opposing spring forces.

41 Claims, 11 Drawing Sheets

FRONT SUSPENSION FOR A MOTORIZED TRIKE

CROSS REFERENCE TO RELATED APPLICATIONS

This application claims the benefit of U.S. Provisional Application No. 60/044,745, filed Apr. 18, 1997.

FIELD OF THE INVENTION

This invention relates generally to front suspension systems for motorcycles and more particularly, to an improved front suspension system for use with a motorized trike.

BACKGROUND OF THE INVENTION

On a conventional motorcycle, the front suspension is situated between the single front tire and the forward portion of the motorcycle frame, often referred to as the frame neck or stem. The front suspension supports the forward weight of the motorcycle and riders as well as insulating both against road shocks being transmitted through the front tire. In addition, the front suspension allows for the steering and handling of the motorcycle under varying loads, road conditions and driving styles.

A popular form of a conventional motorcycle front suspension includes a pair of generally parallel front and rear forks. The rear forks are coupled at their upper ends to the forward portion of the motorcycle frame and extend downwardly to pivotally attach to a pair of rocker arms. The front forks are also pivotally coupled at their lower ends to the pair of rocker arms. The rocker arms extend forwardly of the forks where they are coupled to the front tire. The front forks are movably coupled relative to the rear forks to allow pivotal movement of the rocker arms. This relative fork movement acts to accommodate road shocks transmitted by the front tire. This relative movement is generally dampened using the shock absorbing device.

In recent years, the popularity of motorcycles has greatly increased. This increase in popularity has resulted in the creation of many new forms of motorcycles as well as in the development of many variations of the more traditional, or conventional motorcycle. In particular, there has been an increased popularity of motorcycles having high-powered engines.

The search for additional power has resulted in the use of larger and heavier engines. In many applications, automotive type engines and particularly, V-8 engines are used. However, the front suspension of most motorcycles is generally not designed for use with these heavier engines. The increased weight and power can affect the steering and handling characteristics of the motorcycle as well as reduce structural safety factors. There is thus, a need for a motorcycle front suspension which has the capacity to support heavier and more powerful engines while retaining conventional steering and handling characteristics.

In addition to the increased popularity of motorcycles, there has also been an increase in the popularity of three-wheeled motorcycles or motorized trikes. Typically, a motorized trike, or just "trike", includes a forward frame portion which is similar to the forward frame portion of a conventional motorcycle. This forward frame portion couples to a front suspension which is typically substantially similar to a conventional motorcycle front suspension. The rear portion of the frame supports a pair of spaced apart rear wheels. Motorized trikes allow users to enjoy the many benefits of conventional motorcycles without requiring the same physical ability. In addition, motorized trikes generally have increased passenger and load carrying capabilities.

Motorized trikes are commonly built by first purchasing a conventional two-wheeled motorcycle and then modifying it. The modifications require connecting a trike frame to the conventional motorcycle front suspension and a pair of spaced apart rear wheels to the rear portion of the frame. The existing motorcycle engine may be coupled to the rear wheels, or alternatively, a higher powered engine may be used. The use of higher powered engines is often desirable since the trike is heavier and generally adapted for carrying increased loads as compared to conventional motorcycles. In some applications, automotive or even custom engines are used.

As an example, trike enthusiasts often utilize, or desire to utilize, V-6 or V-8 automotive-type engines. These engines produce substantially higher outputs of horsepower and torque. However, these engines are substantially heavier than conventional motorcycle engines. These larger engines can overload the front suspension which is not designed for the handling characteristics as well as the tire and braking needs of the higher powered and heavier motor. Thus, these changes can significantly affect the overall suspension, including the way the trike handles, resulting in compromised safety factors as well as road handling safety. In addition, side forces encountered when turning a trike are generally more severe than those encountered when turning a conventional motorcycle. These side forces create twisting moments on the front suspension and can cause dangerous free-play action and wheel wobble. Thus, there is a need for a front suspension which is adapted for use with a motorized trike and which can support the increased load and power capacities of these larger engines while providing conventional motorcycle road handling and safety characteristics.

The construction of a motorized trike generally requires the purchase of a conventional motorcycle which may be used for its front suspension and other various parts. Conversion kits are available for these modifications. However, the purchase of a motorcycle, as well as a modification kit is expensive. In particular, the front suspension is often a major cost and thus a major limitation when manufacturing a motorized trike. These high costs are often attributed to limiting the potential growth of the motorized trike industry. There is thus, a need for a front suspension which is adapted for use with a motorized trike and which is inexpensive to manufacture.

SUMMARY

The present invention provides a motorcycle front suspension which is capable of supporting increased dynamic loads while maintaining the conventional motorcycle styling and ride characteristics by providing an improved front fork and spring assembly. The use of a lower spring/shock/fender support bracket to advantageously support the lower shock absorbing springs in conjunction with a lower triple tree bracket allows the use of opposing coil springs with an in-line suspension and thus increase the overall suspension capacity. In addition, by simplifying the overall front suspension and reducing the overall number of components, the motorcycle front suspension of the present invention is greatly simplified and the costs of manufacturing reduced.

The present invention also provides a front suspension which is ideally suited for use on a motorized trike. By providing a front suspension capable of supporting increased weight and loads, motorized trikes may now be fitted heavier larger and more powerful engines. By providing rearwardly mounted steering in conjunction with a mechanically advantaged linkage, the front suspension of the present invention greatly improves the otherwise poor handling characteristics associated with the larger dynamic loading demands often required in modern trike applications. In addition, by reducing the number of necessary components and simplifying the design, the cost of the front suspension is greatly reduced.

The front suspension of the present invention includes a pair of spaced-apart and generally parallel rear forks. Each of the rear forks has an upper end and a lower end. An upper bracket is attached to the upper end of each rear fork and spans across their separation. The upper bracket includes an upper stem bore which is located between the rear forks and is adapted for pivotal connection with a frame stem on the motorcycle frame.

A lower bracket is also connected to each of the rear forks and spans across their separation. This lower bracket is secured to the frame members between their upper and lower ends and supports the forks in substantially parallel alignment. The lower bracket, which is generally parallel with the upper bracket, includes a stem bore which is adapted for pivotal connection with the motorcycle frame. Typically, the frame stem is inserted between the upper bracket and the lower bracket and secured with a stem shaft and a retainer nut. The centerline of the stem, stem bores and the stem shaft are generally aligned parallel with the front and rear forks. This form of attachment allows for conventional steering between the motorcycle frame and the front suspension.

A rocker arm is pivotally mounted to the lower end of each rear fork and extends laterally forward to a distal end which is adapted for connection with a front axle. The front axle, which supports the front wheel and tire, spans across a pair of opposing axle bores in the rocker arms.

A front fork is pivotally attached to each of the rocker arms between the respective rear fork and the forwardly located axle bore. Each front fork extends upwardly and generally parallel to the rear forks. A fork rod is attached to an upper end of each front fork and extends upwardly through a bore in the lower bracket. A fork rod bushing is mounted in each of the lower bracket bores to facilitate axial movement of each fork rod through the lower bracket.

A spring and fender support bracket extends across and is attached to each of the front forks between the respective rocker arm and the lower bracket. The spring support bracket advantageously supports a pair of lower springs. Each of the springs is mounted along a front fork and supported between the spring support bracket and the lower bracket. The lower springs are maintained in a normally compressed state such that an outward force is exerted between the spring support bracket and the lower bracket. In this way, any upward force or road shock on the front tire is transferred through the front forks and resisted by the lower springs.

Similarly, a pair of upper springs are mounted between the lower bracket and an upper end of each of the front forks. A spring retainer is used to retain each of the upper springs relative to an upper end of each fork rod. The upper springs are also maintained in a normally compressed state such that an axially outward normal force is exerted between the upper end of the fork rods and the lower bracket. Thus, the upper springs exert an upward acting force on the front forks which resists the downward force applied by the lower springs.

The upper springs also act to maintain proper ride height by supporting the weight of the front tire and wheel, front forks and any other attached devices. The use of lower springs in conjunction with opposing upper springs allows for active travel of the front forks relative to the rear forks while maintaining the vehicle weight. A shock absorbing device may be used to dampen the movement of the front forks from a normal or static position through either an upper or lower position.

In another aspect of the present invention, the lower and upper springs are coil springs. Each of the lower coil springs is mounted around one of the front forks and each is supported between the spring support bracket and the lower bracket. Similarly, each of the upper springs is respectively mounted around a fork rod between the respective lower bracket and a spring retaining device or stop. In this configuration, the movement of the front forks relative to the rear forks is restrained by the opposing lower and upper pairs of coil springs. The spring stops mounted at the upper end of each fork rod may be adjusted along the length of the respective fork rod to either lengthen or shorten each of the upper springs. This alters the spring stiffness and thus, the ride characteristics of the front suspension.

This invention, together with the additional features and advantages thereof, which is only summarized in the foregoing passages, will become more apparent to those of skill in the art upon reading the description of the preferred embodiments, which follows in the specification taken together with the drawings.

DESCRIPTION OF THE PREFERRED EMBODIMENTS

Figure 1:
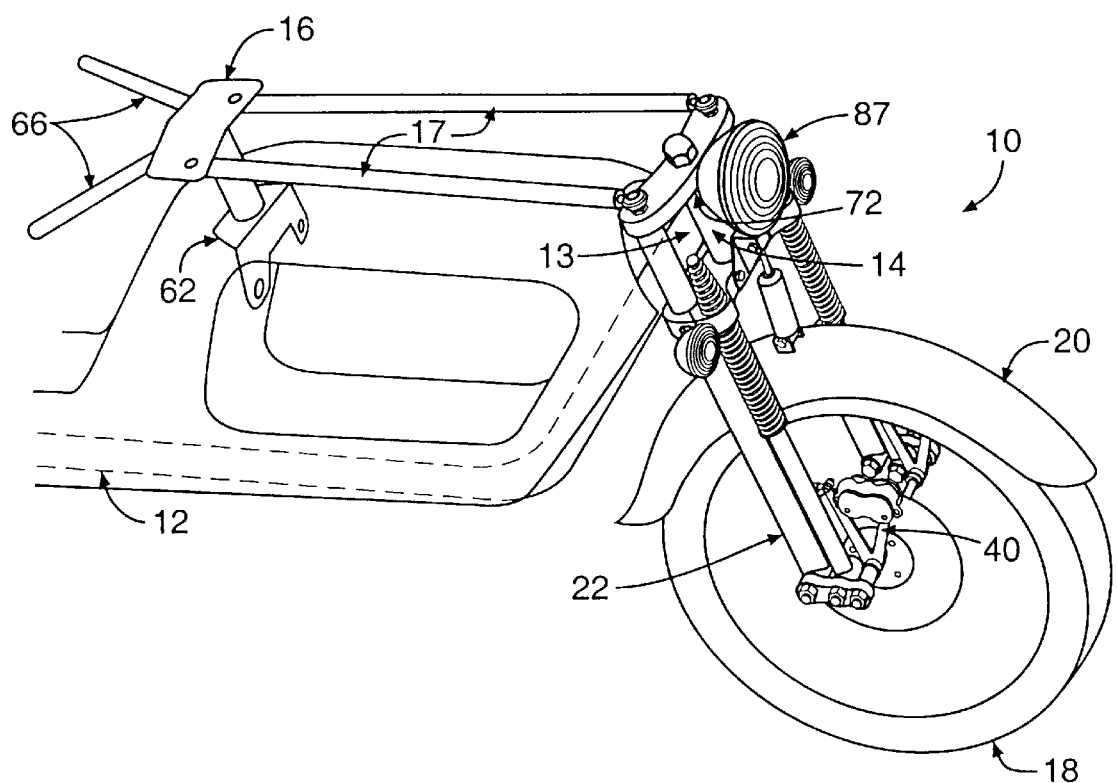
FIG. 1 is a partial perspective view of an embodiment of a front suspension constructed according to the principles of the present invention and shown on a motorized trike.

Referring now to FIG. 1, an embodiment of a front suspension for a motorized cycle constructed according to the principles of the present invention will be described, and is generally referred to as reference numeral 10. As illustrated in FIG. 1, the front suspension 10 is attached to a motorcycle 12, which may be a conventional two-wheeled motorcycle or alternatively a motorized trike. In this description, "motorcycle" refers to any wheeled vehicle having a single front wheel and supported by a front suspension. Thus, motorcycle includes both two-wheeled motorcycles as well as three-wheeled motorcycles or trikes. The motorcycle 12, generally includes a frame 13 which terminates into a frame stem 14 at the forward end. The frame stem 14 is used to pivotally connect the motorcycle 12 to the front suspension 10.

A steering assembly 16 may be remotely mounted on the motorcycle 12 and interconnected with the front suspension 10 through a pair of steering rods 17. Alternatively, the steering assembly 16 may be mounted directly to the front suspension 10 and the steering rod 17 omitted. The front wheel and tire 18 is rotatably supported at the lower end of the front suspension 10. A front fender 20 as well as other devices, may also be supported by the front suspension 10.

Referring now to FIGS. 2–5, the motorcycle front suspension 10 of the present invention will be described in greater detail. In particular, the front suspension 10 may include a pair of spaced-apart rear forks 22, each having an upper end 24 and a lower end 26. The rear forks 22 are preferably made from a length of metal tubing and more preferably from a steel tubing. In a preferred embodiment, the rear forks 22 comprise steel tubing having an outer diameter of 1.75 inches and a length of approximately 30 inches. However, these dimensions are only given as an embodiment and vary depending on the tubing type as well as many other factors. For example, some of these factors may include; the motorcycle type and size, load conditions, as well as desired styles.

For purposes of this disclosure, "lower", such as lower end 26, shall refer to the location or direction nearest the ground, while "upper" shall relate to the location or direction generally skyward and thus, away from the ground. In a similar fashion, "forward" shall refer to the location or direction nearest the forward most position on the motorcycle 12 or front suspension 10.

An upper bracket 28, which may also be referred to as a top triple tree bracket, is rigidly attached to the upper end 24 of each rear fork 22 and spans there across. Preferably, the upper bracket 28 is pivotally connected to each of the spaced apart steering rods 17 through a respective pivot or ball type joint. More preferably, the pivot joint includes a fastener end which bolts through both the upper bracket 28 and into the respective fork 22. This type of connection advantageously reduces internal stresses which would be created in a welded connection. Otherwise, the upper bracket may be coupled to the forks 22 through fasteners such as high-strength machine screws. Alternatively, other fasteners may be used, such as for example, studded rod ends.

A lower bracket 30, which may also be referred to as a bottom triple tree bracket, is be secured to and spans across the rear forks 22 in a similar fashion to the upper bracket 28. The lower bracket 30 is located along the length of each fork 22 between the upper end 24 and the lower end 26. Preferably, the lower bracket 30 is connected to each rear fork through a pinch type compression connection as will be described in greater detail following.

A rocker arm 32 is connected to the lower end 26 of each rear fork 22 and extends forwardly to an axle bore 33 which is adapted to support the front wheel 18 in a conventional fashion. Preferably, each of the rocker arms 32 is pivotally connected to the lower end 26 of each rear fork 22 to form a pivot joint 34. This pivot joint 34 may be constructed by orienting narrow sections of tubing perpendicular to the lower end 26 of each fork 22. These perpendicular sections may be welded to the respective fork 22.

Each rocker arm 32 is connected to the respective rear fork 22 using a pair of opposing bushings 35 and an integral spacer 36 which are secured through a faster 37 passing through their centers. Preferably, each bushing 35 includes an outwardly facing shoulder for separating the respective rocker arm 32 and rear fork 22. The fasteners 37 securely compress the bushings 35 to create pivot joints 34 which are advantageously designed to resist wobble or free-play.

The bushings 35 may be made from any bushing material having sufficient strength and wear characteristics for a high load motorcycle suspension. Such bushings 35 may include, for example, bronze bushings, high-strength polyurethane bushings or other bushings as are known. The opposing bushings 35 may be hand pressed into pivot joint 34 at the lower end 26 of each fork 22. When installed, each pivot joint 34 preferably includes a gap between the opposing bushings 35. This gap is provided for a grease or other lubricant. The lubricant may be applied through a device, such as for example, a zerk fitting. This design reduces suspension wear and noise and increases the overall suspension action.

Figure 4:
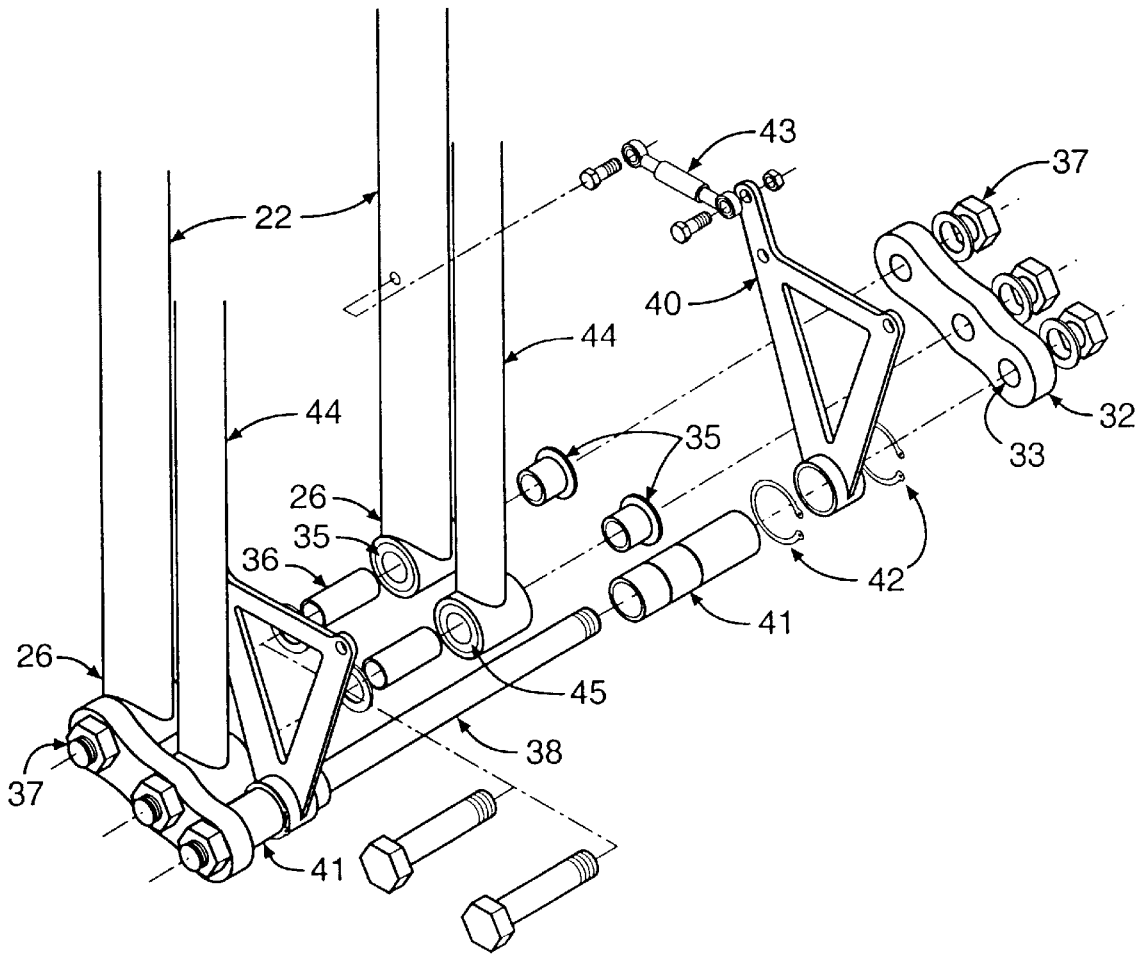
FIG. 4 is an exploded view of a lower portion of the front suspension of FIG. 2.

As discussed, each rocker arms 32 extend laterally forward to the front axle bore 33. The front wheel and tire 18 may be mounted to the opposing rocker arms 32 through a front axle 38 in a conventional fashion as is known to those of skill in the art. A caliper brake assembly 40 is coupled over the axle assembly 38 for use as a front brake. Preferably, a pair of caliper brake assemblies 40 are used, with each being located on either side of the wheel 18 and over a wheel spacer 41. Each caliper assembly 40 may secured along the wheel spacer 41 by use of fasteners 42, such as, for example, retaining clips (FIG. 4). Each caliper assembly 40 may be prevented from rotating about the wheel spacer through a support fastener 43, such as a fastening linkage coupling the upper end of each caliper to a respective rear fork 22.

A front fork 44 is pivotally coupled to each of the rocker arms 32 at a front pivot point 45. Each front fork 44 is preferably coupled to the respective rocker arm 32 between the pivotally coupled rear fork 22 and the respective front axle bore 33. The front forks 44 extend upwardly from the respective rocker arm 32 in a direction generally parallel with the rear forks 22. Similar to the rear forks 22, each of the front forks 44 is preferably made from a cylinder of a metal and more preferably from a steel tubing. An upper end 47 of each fork rod may be constructed of a short section of steel rod or thick walled tubing which has been axially taped or otherwise adapted for receiving a fastener. The short section is then welded to the tubing to form the overall front fork 44. In a preferred embodiment, each of the front forks 44 may comprise machined steel tubing with a length of approximately 18 inches, a diameter of approximately 1.1875 inches and a wall thickness of approximately 0.095 inches. However, these dimensions may vary depending on the size and expected loads of the associated motorcycle 12 and other factors as previously discussed with the rear forks 22.

An elongated fork rod 46 is attached to the upper end 47 of each front fork 44 and extends upwardly through a bore 48 in the lower bracket 30. Each fork rod 46 is preferably a steel shaft having opposing threaded distal ends which are aligned parallel with the respective front fork 44. On each end the rod 46 is threadably connected into a threaded bore centered within the upper end 47 of the respective fork 44. A locking bolt or other fastener may be used to lock the fork rod 46 to the fork 44. Alternatively, the fork rods 46 may be welded to the upper end 47 of the forks 44. A fork rod bushing 49 is mounted in each bore 48 to facilitate axial movement of each fork rod 46 through the lower bracket 30. The bushing 49 is preferably press fit into the bore 48 but may also be retained using an adhesive, fasteners, or any other means of attachment as is known to those of skill in the art.

A spring and fender support bracket 51 extends across and is attached to each of the front forks 44 between the respective rocker arm 32 and the lower bracket 30. The spring support bracket 51 advantageously acts as a base support for a pair of lower spring devices 50 comprises a one piece metal structure which is welded or otherwise fixedly attached across the front forks 44. Preferably, the shock dampening device 52 is a shock absorber.

Figure 5:
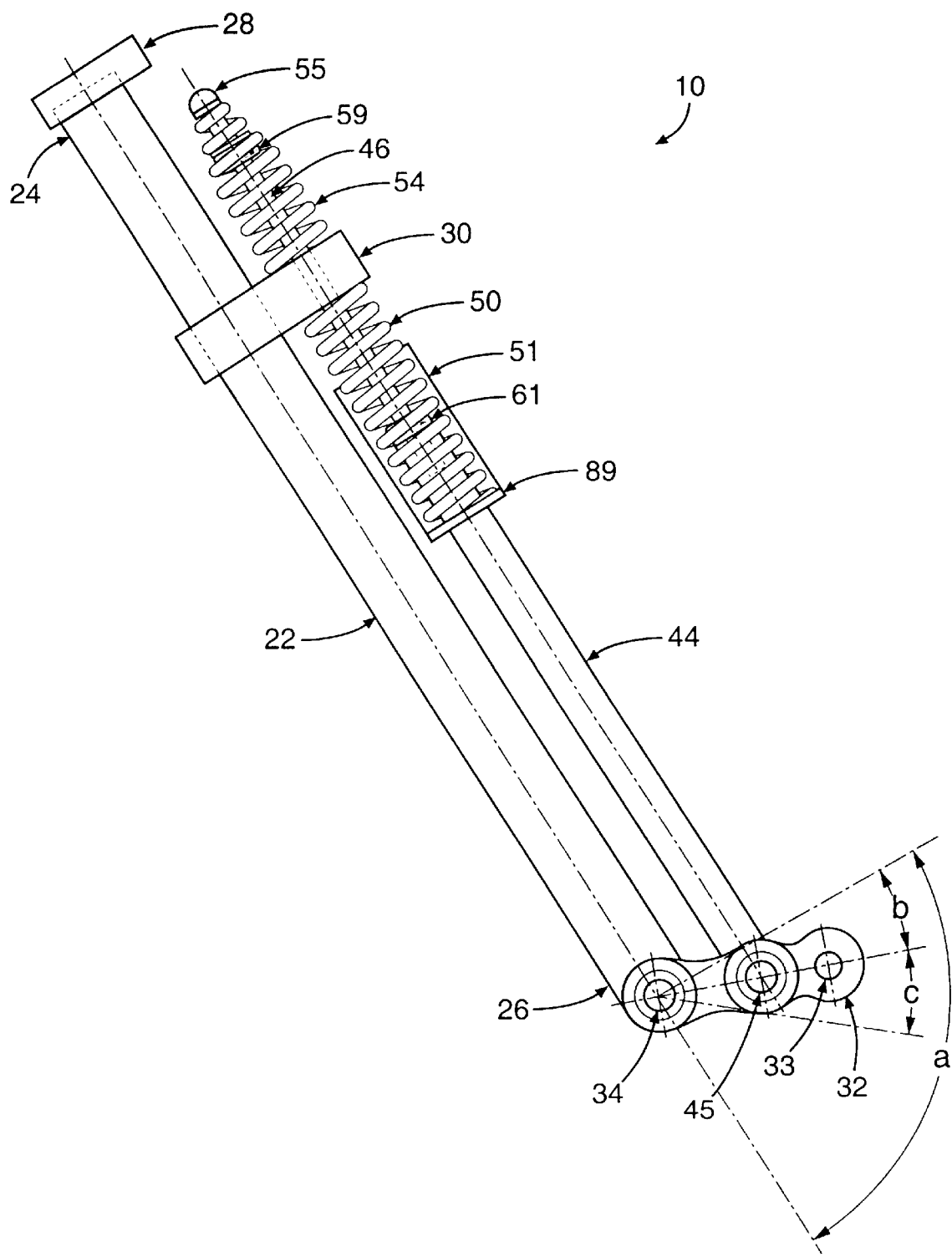
FIG. 5 is a side view of the front suspension of FIG. 2.

Preferably, each of the lower spring devices 50 is a coil spring made from a spring metal or similar material and which is supported around the exterior of each front fork 44. Each coil spring 50 is restrained or otherwise supported at a lower end by the spring supporting bracket 51 and at an upper end by the lower bracket 30. The lower spring device 50 is preferably inserted and normally maintained in compression such that an axially outward or expanding force is exerted between the lower bracket 30 and the spring supporting bracket 51. In this fashion, the lower springs 50 provides resistance to any upward force on the front forks 44 through the front axle 38 or the front wheel 18. Thus, road shock on the front tire 18 is transferred through the front axle 38 into the rocker arms 32. In response, the rocker arms 32 pivot about the fixed rear forks 22 of the rear pivot point 34 (b and c) and force the front forks 44 to move as is best illustrated in FIG. 5. The upward movement of the front forks 44 is resisted by the lower springs 50.

Figure 3:
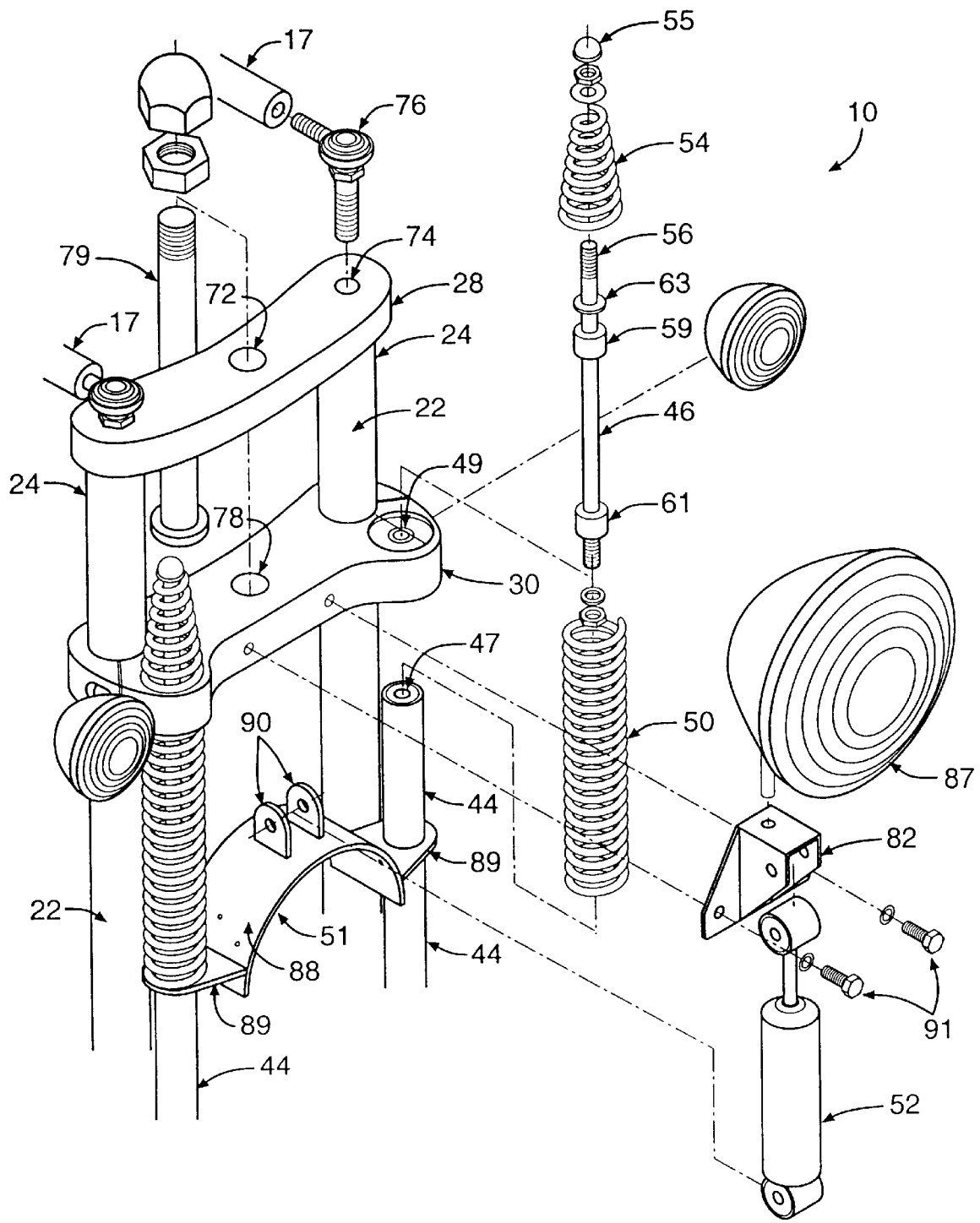
FIG. 3 is an exploded view of an upper portion of the front suspension of FIG. 2.

In a similar fashion, an upper spring device 54 is coupled between the lower bracket 30 and a spring retaining device 55 on an upper distal end 56 of each fork rod 46. Preferably, this spring retaining device 55 is a threaded member which is threadably coupled to the mating threads on the upper end 56 of the respective fork rod 46. For example, the retaining member 55 may be a lock nut with a washer for supporting the upper end of the upper spring 54, as best illustrated in FIG. 3.

Also in a similar fashion to the lower spring device 50, the upper spring device 54 is maintained in compression such that an axially outward or expanding force is exerted between the lower bracket 30 and the spring retaining device 55. Preferably, the upper spring device 54 is a pair of coil springs similar to the lower coil springs but preferably of a lower spring constant. Each upper coil spring 54 surrounds each of the front forks 44 and fork rods 46 respectively. Each spring retaining device 55 is adjustable along the length of the respective fork rod 46 such that the resistance of each upper spring devices 54 may be modified. This adjustability may merely include threading the retaining device 55 along the threaded portion 56 of each fork rod 46 to adjust the length of the respective springs 54.

The upper springs 54 exert an upward acting force on the front forks 44 which resists the downward force applied by the lower springs 50. The upper springs 55 also act to maintain proper ride height by supporting the weight of the front tire and wheel 18, front forks 44 and any other attached devices. The use of lower springs 50 in conjunction with opposing upper springs 54 allows for active travel of the front forks 44 relative to the rear forks 22 while maintaining the vehicle weight. The shock absorber 52 is used to dampen the travel of the front forks 44 from a normal or static position through either an upper or lower position.

Travel bumpers 59 and 61 may be inserted along each fork rod 46 on opposing sides of the lower bracket 30. Each bumper 59 and 61 includes a central passageway which allows a respective fork rod 46 to slidably move through. The bumpers 59 and 61 may also include a shoulder for contact with the respective side of the lower bracket 30 and spring devices 50 and 54. Alternatively, a washer 63 or other similar device may be used to interface between the respective upper spring 54 and the lower bracket 30. The bumpers 59 and 61, including the washers 63 may be secured to the respective fork rods 46 to limit travel of the springs 50 and 54 and thus the overall travel of the front forks 44. The washer 63 may be secured to the respective fork rod 46 through welding. Preferably, the bumpers 59 and 61 are made from an elastic material, such as a rubber or polyurethane.

Referring now back to FIG. 1, the front suspension 10 of the present invention is preferably pivotally coupled to the forward end or front stem 14 of the motorcycle 12. The steering assembly 16 may be directly coupled to the front suspension 10, such as for use on a conventional motorcycle 12, or alternatively, may be remotely attached rearwardly on the motorcycle. In particular, when using the front suspension 10 of the present invention on a motorized trike 12, the steering assembly 16 may preferably be located rearward of the front suspension 10 and linked through steering rods 17. The steering assembly 16, may be advantageously configured for such remote placement.

Figure 6:
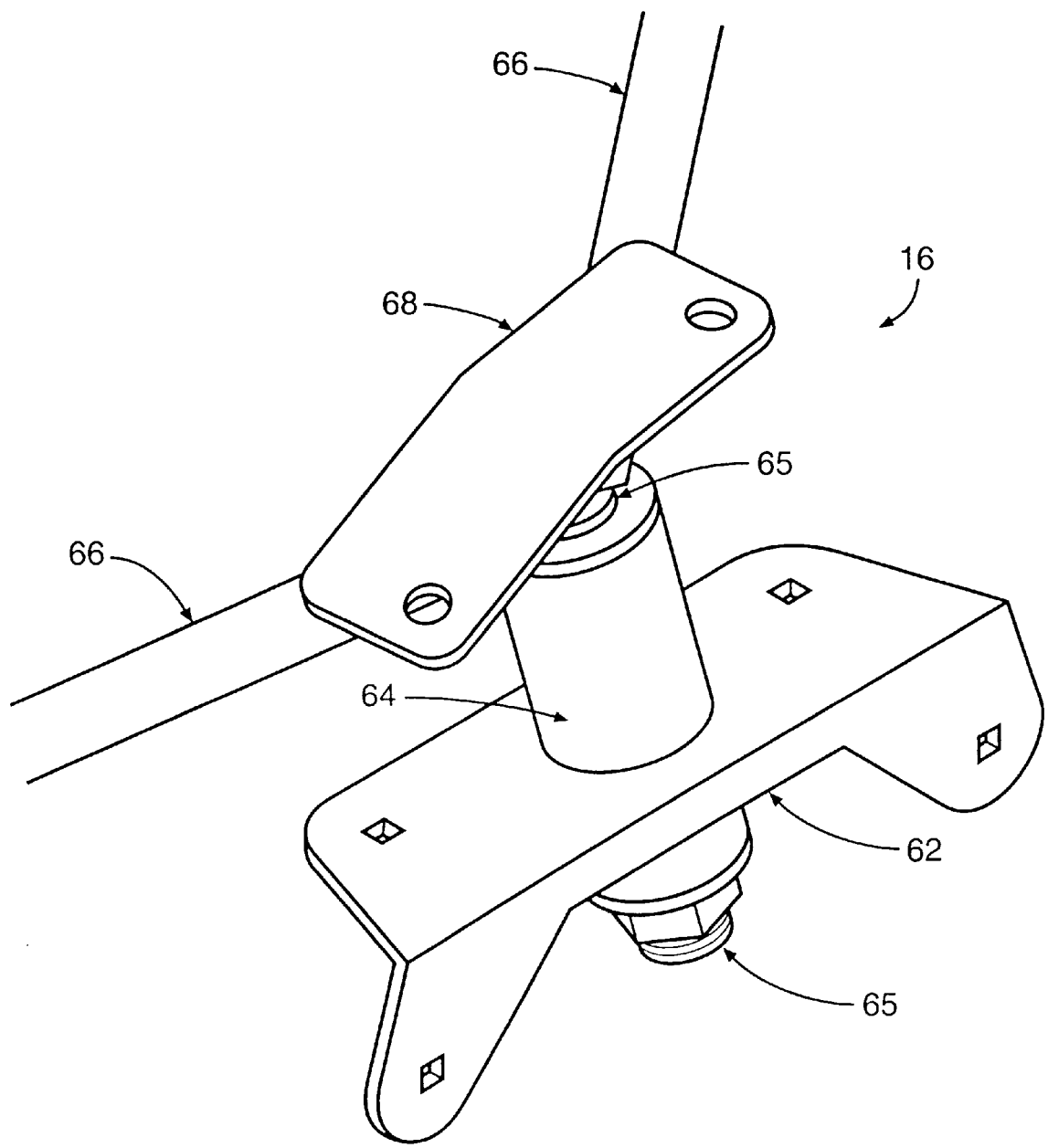
FIG. 6 is a front perspective view of an embodiment of a steering column assembly constructed according to the principles of the present invention.

Referring now to FIG. 6, the steering assembly 16 may include a mounting plate 62, a steering column 64, a steering shaft 65, a pair of handle bars 66 and a steering rod adapter plate 68. The mounting plate 62 is advantageously adapted for remote placement on the motorized trike. The mounting plate 62 rotatably supports the steering shaft 65 within the steering column 64. The shaft 65 is generally parallel to the centerline of the frame stem 14 and roughly perpendicular to the handlebars 66.

The adapter plate 68 may be secured to a center portion of the handle bars 66 and adapted for connection with the steering rods 17. The steering rods 17 may be connected using pivot joints as previously described. In addition, mounting locations may be provided on the adapter plate 68 for the mounting and securing of a windshield. The steering assembly 16 is advantageously provided as a single piece component. This provides a complete assembly without the need for multiple parts or adjustments. A similar steering assembly 16 may be provided for direct mounting on the front suspension 10 as is known to those of skill in the art.

The adapter plate 68 is advantageously configured to utilize the steering rods 17 to remotely pivot or turn the upper bracket 28. The steering rods 17 may be coupled and directed from the steering rod adapter 68 to the upper bracket 28 along an increasingly widening path, i.e., where the spacing between the steering rods is increasing, such that a mechanical advantage is utilized. However, any configuration of a remotely or directly attached steering assembly 16 may be utilized as is known to those of skill in the art.

Figure 2:
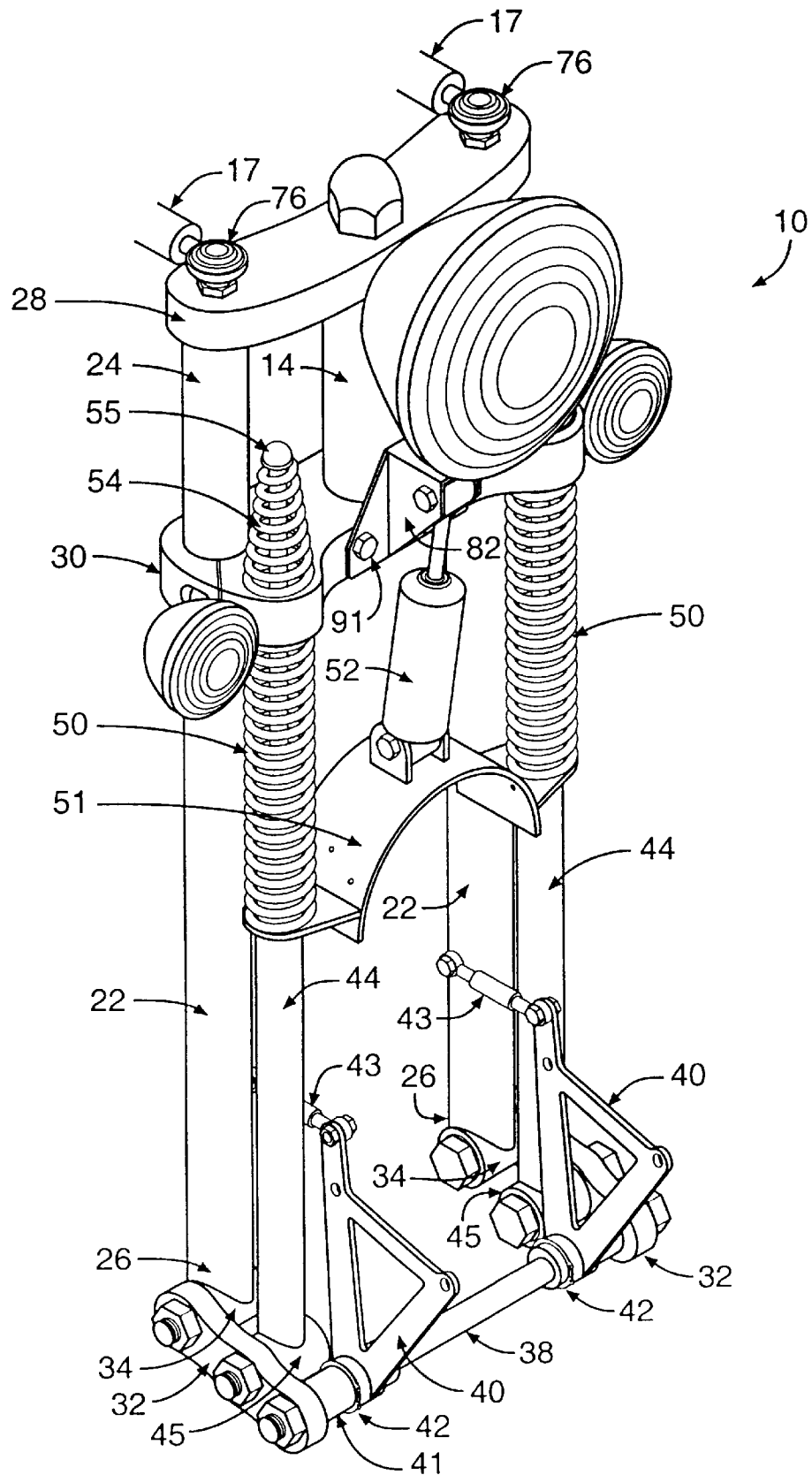
FIG. 2 is a perspective view of the front suspension of FIG. 1.
Figure 7:
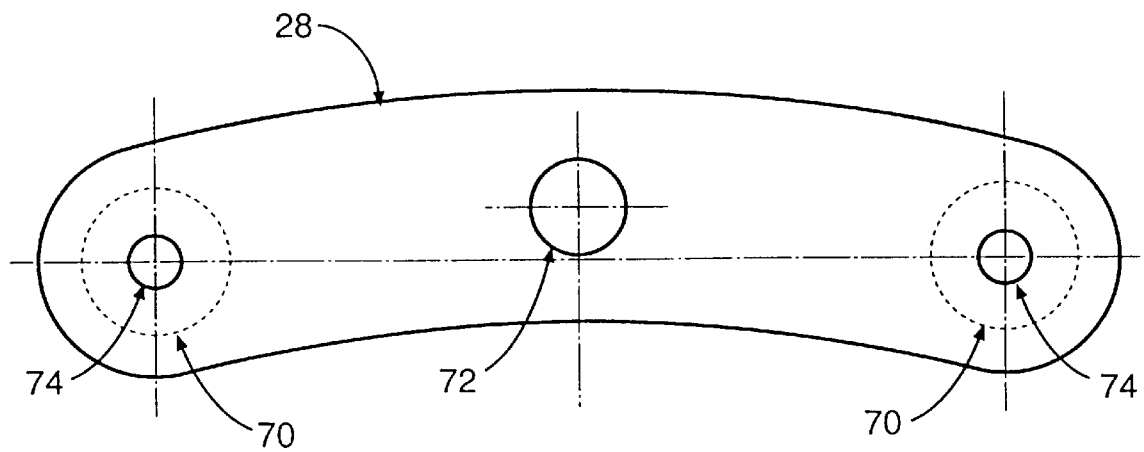
FIG. 7 is a top view of an embodiment of an upper bracket according to the present invention.
Figure 8:
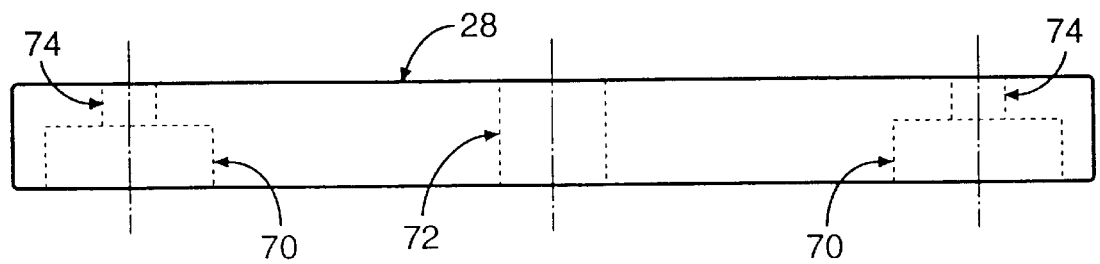
FIG. 8 is a side view of the upper bracket of FIG. 7.

Referring now to FIGS. 7–8, the upper bracket 28 preferably includes a pair of countersunk portions 70 adapted for receiving the upper end 24 of the respective rear fork 22 (FIG. 2). The upper bracket 28 also includes a generally centrally located frame attachment bore 72. Preferably, each of the countersunk portions 70 is a partial bore such that the upper end 24 of each rear fork 22 is centered and retained within the countersunk portion of the upper bracket 28. Retaining bores 74 are provided above each of the fork bores 70 for passage of a fork retaining fastener 76 (FIG. 2 and 3), such as, for example, a ball type joint, a shoulder bolt, an eye bolt or any similar device which may also be attached to the ends of each steering rod 17. Alternatively a fastener such as a socket head cap screw may be used when a direct steering configuration is used. However, any configuration of retaining the rear forks 22 to the upper bracket 28 may be used.

In yet another alternative fashion, each of steering rods 17 may be secured to various locations across the upper bracket 28. In this fashion, a mechanical advantage may also be gained for the remote attached steering assembly 16. The frame attachment bore 72 is preferably located forwardly of a center-line between the center of each countersunk portion 70 to establish a reduced trailing action as will be described in greater detail below. The upper bracket 28 may preferably be made from a metal. In a preferred embodiment, the upper bracket 28 may be made from a metal such as an aluminum bar stock and have dimension of approximately 12.75 inches across by 3.5 inches wide and 1.25 inches thick. However, other materials and dimensions may be used.

Figure 9:
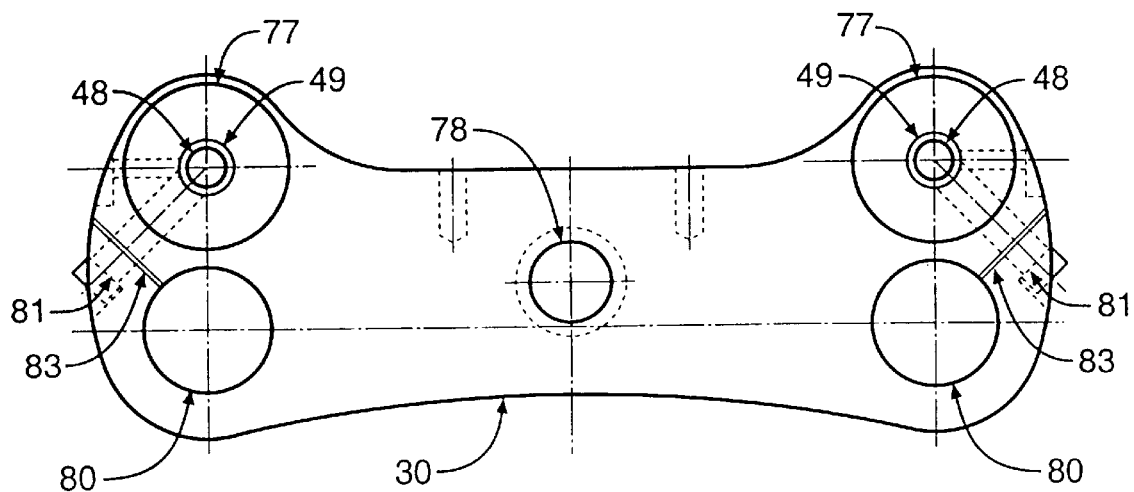
FIG. 9 is a top view of an embodiment of a lower bracket constructed according to the principles of the present invention.
Figure 10:
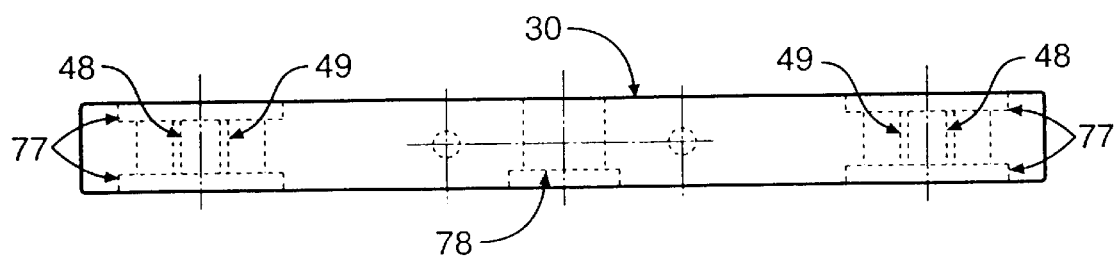
FIG. 10 is a side view of the lower bracket of FIG. 9.

With reference to FIGS. 9–10, the lower bracket 30 is configured in a similar fashion as the upper bracket 28. However, the lower bracket includes an additional pair of front bores 48 for slidably supporting each of the fork rods 46. Annular alignment grooves or countersunk circular regions 77 are formed around the top and bottom of each bore 48 for centering the coil springs 50 and 54 around each of the front forks 44 and respective fork rods 46. Alternative devices or methods may be used to center the springs 50 and 54 around the front forks 44 and respective fork rods 46, however centering is important for reducing noise and wear.

A lower frame stem bore 78 extends through the lower bracket 30, is generally centrally located between the rear forks 22 and the front fork 44. This frame stem bore 78 is preferably aligned with the upper frame stem bore 72 and parallel with the rear forks 22 such that the motorcycle frame 13 or frame stem 14 may be inserted between the upper bracket 28 and the lower bracket 30. A steering shaft 79 (FIG. 3) is inserted through the frame stem 14 on the motorcycle 12 and the stem bores 72 and 78, such that the frame stem 14 is pivotally coupled between the upper and lower brackets 28 and 30 and is pivotally secured parallel with the rear forks 22. A countersunk outer bore may be provided on the underside of the bracket 30 for receiving a distal end of the steering shaft 79.

Referring now to FIG. 2 in conjunction with FIGS. 9 and 10, each of the rear forks 22 passes through a respective rear bores 80 in the lower bracket 30. A slit 83 or groove is passed through the lower bracket 30 between each respective sidewall and each bore 80. The slits 83 allow each rear fork 22 to be compressively secured within the respective bore 80 through a retaining bolt 81, such as a pinch bolt or other type of machine screw. In this fashion, the lower bracket 30 may be secured at varying locations along the height of the rear forks 22 and adjusted for each motorcycle 12 application. In addition, this method of attachment reduces stresses found with other methods of attachment such as welding.

Figure 11:
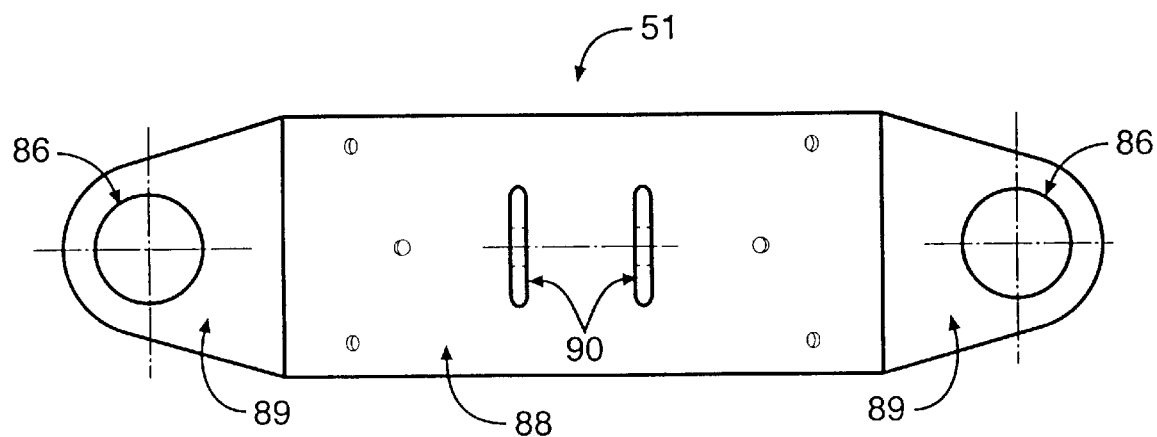
FIG. 11 is a top view of an embodiment of a spring/shock/fender bracket constructed according to the principles of the present invention.
Figure 12:
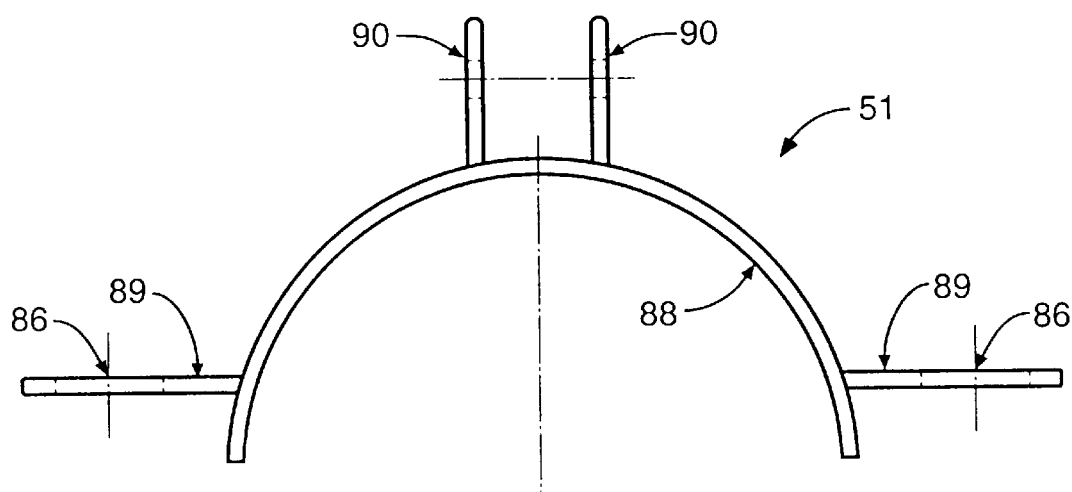
FIG. 12 is a side view of the spring/shock/fender bracket of FIG. 11.

Referring now to FIGS. 11 and 12, the spring and fender support bracket 51 will be described in greater detail. A pair of side sections 89, each having a fork bore 86 may be provided for insertion about each of the front forks 44. The use of the bores 86 allows precise locating of the spring supporting bracket 51 for fixed attachment along the length of to the front forks 44. This attachment may be through welding or other methods as are known to those of skill in the art. Preferably, the spring supporting bracket 51, which is also preferably utilized for supporting a front fender 20 and a shock dampening device 52 (FIG. 1), or any other cosmetic devices as may be desired, is made from a metal.

In a preferred embodiment, the spring supporting bracket 51 comprises a stamped steel curved center section 88 having plate steel side sections 89 welded to the outside. The side sections 89 are adapted for securement to each of the front forks 42 and to support a respective lower end of a lower spring 50. The spring supporting bracket 51 may be also constructed of any other structural material and using any method of construction, such as utilizing a section of steel pipe or tubing to form a semi-cylindrical center section 88. The center section 88 advantageously follows the sectional curvature of the front tire and conforms the shape of the fender 20. Mounting holes or brackets may be provided for the securement of the fender 20 or other attachment.

A clevis or similar bracket 90 may be attached to apex of the curved section 88 for securement with the shock dampening device 52. In a preferred embodiment, the spring supporting bracket 51 is sufficiently rigid to support each of the front forks 44 in a spaced-apart fashion while rigidly supporting the lower spring devices 50. This unique single piece bracket 51 advantageously eliminates the need for multiple and expensive supporting components.

Figure 13:
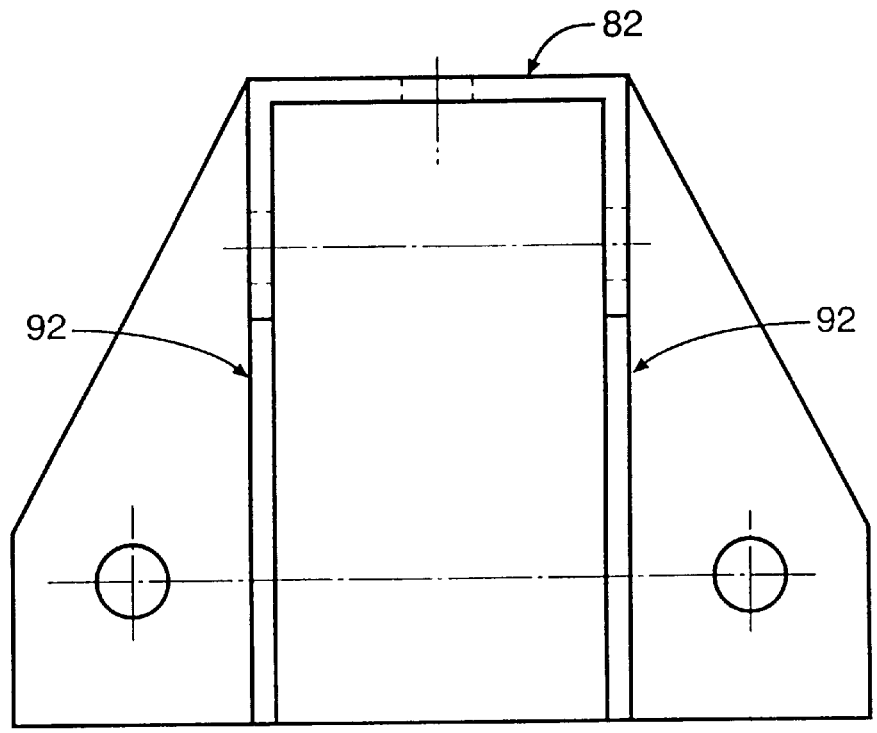
FIG. 13 is a front view of a head lamp and shock mount bracket constructed according to the principles of the present invention.
Figure 14:
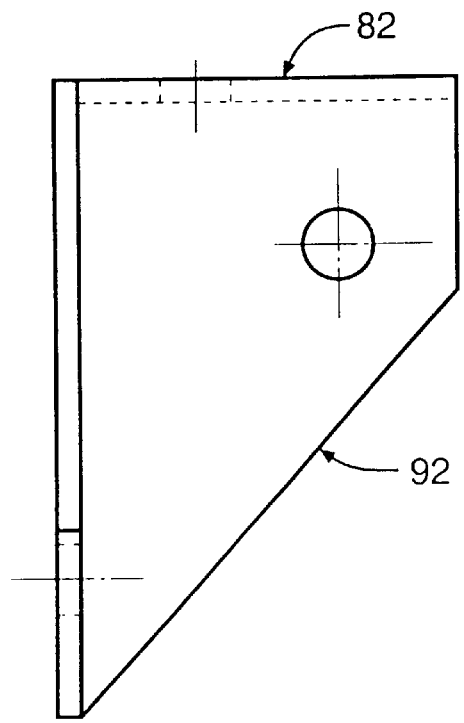
FIG. 14 is a side view of the head lamp and shock mount bracket of FIG. 13.

Referring now to FIGS. 13 and 14, an upper shock and headlight mounting bracket 82 is shown. The bracket 82 includes side gussets 92 as necessary to carry the required loads. The bracket 82 may be attached to the lower bracket 30 as best illustrated in FIG. 3. This attachment may be secured through bolts 91, other fasteners, welding, or any other means as is commonly known to those of skill in the art. The upper shock mounting bracket 82 may be configured for use with either a top or a side mounting shock dampening device 52 as also illustrated in FIG. 3, as well as being a device for mounting a headlight. As previously mentioned, the shock dampening device 52 is preferably a conventional shock absorber with sufficient travel to accommodate the movement of the front forks 44 relative to the rear forks 22.

Figure 15:
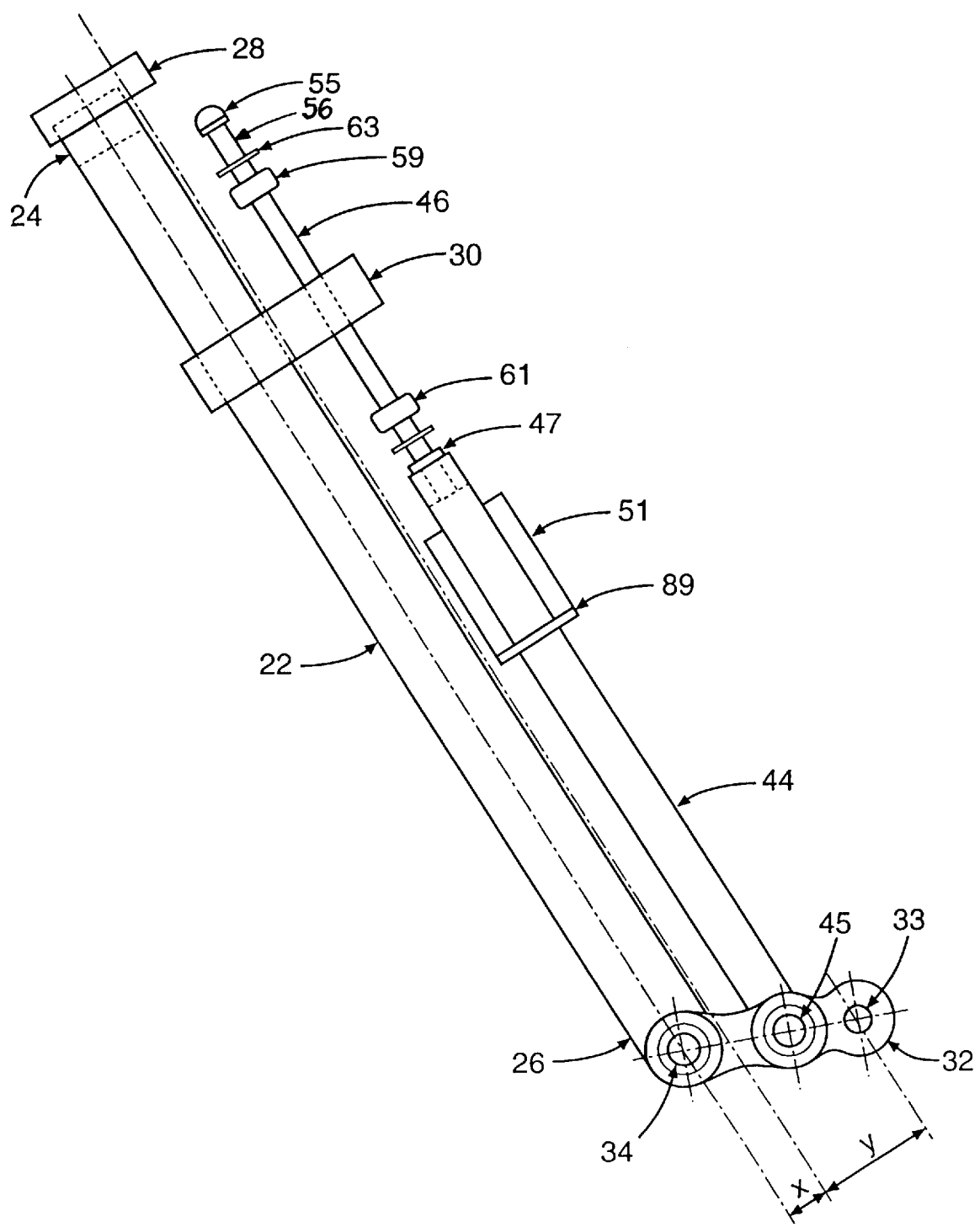
FIG. 15 is a diagrammatic side view of an embodiment of the front suspension system according to the present invention showing a reduced trail configuration.

Referring now, back to FIGS. 1–5, in conjunction with FIG. 15, the operation of the front suspension 10 of the present invention will be described. As previously discussed, the front suspension 10 is coupled to the forward portion or fork stem 14 of the motorcycle 12. A steering assembly 16 is then directly coupled to the upper bracket 28 such that the front wheel 18 may be directed accordingly and the motorcycle 12 steered. Alternatively, the steering assembly 16 may be attached to the motorcycle 12 inwardly from the front suspension 10 using the single piece steering assembly 16 as previously described.

When a bump or other road shock is encountered, the front tire 18 will typically move downward or upward resulting in the shock being transmitted through the front axle 38 into the rocker arms 32. This force results or causes a pivoting of the rocker arms 32 about the rear pivot 34. This pivoting forces each of the front forks 42 to move relative to the rear forks 22 along a parallel path. More specifically, the fork rods 46 slidably move through the lower bracket 30. As previously discussed, the lower springs 50 resist movement of the front forks 44 upwardly while the upper springs 54 resist movement of the front forks 44 downwardly. Additionally, the shock absorber 52 dampens this movement as is known to those of skill in the art.

Because the resisting spring force of the lower and upper springs 50 and 54 is adjustable, the response of the present front suspension 10 to such road bumps is also adjustable. Alternatively, the response of the front suspension 10 may be adjusted according to the particular motorcycle 12 or even the rider. The location of the stem bores 72 and 78 within the respective upper and lower brackets 28 and 30 forwardly of the rear forks 22 and rearwardly of the front forks 44 advantageously reduces trail action caused by the elongated distance between the rear pivot points and the axle bores 33 along the rocker arms 32. This reduced trail enhances handling characteristics. In addition, the alignment of the stem bores 72 and 78 with the forks 22 and 44 further promotes superior handling.

It will be understood that various modifications can be made to various embodiments of the present invention herein disclosed without departing from the spirit and scope thereof. For example, various sizes of the front and rear forks as well as the lower and upper brackets and other associated parts are contemplated as well as the various types of construction materials. Also, various modifications may be made in the configuration of the parts and their interaction. Therefore, the above description should not be construed as limiting the invention, but merely as an exemplification of preferred embodiments thereof. Those of skill in the art will envision other modifications within the scope and spirit of the present invention as defined by the claims appended hereto.

What is claimed is:

1. A front suspension system for use with a motorcycle having a frame and a single front wheel, said suspension system comprising:
    a pair of spaced apart and generally parallel rear forks, each extending between an upper end and a lower end;
    an upper bracket attached to the separate upper ends of each rear fork and adapted for pivotal connection with the frame;
    a lower bracket attached to the rear forks and adapted for pivotal connection with said frame;
    a pair of rocker arms, each being pivotally mounted to the lower end of each rear fork and extending forwardly to an axle bore, the axle bores adapted for connection with a front wheel;
    a pair of spaced apart and generally parallel front forks, each pivotally attached to each rocker arm between the respective front fork and the axle bore and extending upwardly and generally parallel to the rear forks;
    a pair of front fork rods, each being connected to each front fork at a lower rod end and extending slidably through the lower bracket in parallel alignment with the respective front fork;
    a spring support bracket attached to each front fork between the rocker arms and the lower bracket;
    a pair of upper springs, each extending along each fork rod between an upper end of the fork rod and the lower bracket and being normally maintained in compression such that an outward force is exerted separating an upper end of the fork rods and the lower bracket; and
    a pair of lower springs each extending along each front fork between the lower bracket and the spring support bracket and being normally maintained in compression such that an outward force is exerted separating the spring support bracket and the lower bracket;
    wherein the front forks are movable relative to the rear forks in response to pivotal movement of the rocker arms and wherein the fork movement is restrained by the opposing lower and upper springs.

2. A front suspension as recited in claim 1 wherein each of the upper springs comprises a coil spring.

3. A front suspension as recited in claim 1 wherein each of the lower springs comprises a coil spring.

4. A front suspension as recited in claim 2 wherein each of the lower springs comprises a coil spring.

5. A front suspension as recited in claim 2 wherein the upper end of each fork rod has a spring retaining device for maintaining the respective upper spring in compression against the lower bracket.

6. A front suspension as recited in claim 5 wherein each of the spring retaining devices is adjustable along the length of the respective fork rod for adjusting the length the respective spring to modify the spring rate.

7. A front suspension as recited in claim 4 wherein each of the upper springs has a lesser spring stiffness than each of the lower springs.

8. A front suspension as recited in claim 4 wherein the spring support bracket comprises a curved center portion positioned between the front forks and opposing side portions, each of the side portions supporting a respective lower spring.

9. A front suspension as recited in claim 4 and further comprising a travel stop on each of the fork rods for limiting the amount of rod travel axially through the lower bracket.

10. A front suspension as recited in claim 9 wherein each of the travel stops is adjustable along the length of each fork rod.

11. A front suspension as recited in claim 8 and further comprising a shock absorbing device extending between the lower bracket and the center portion of the spring support bracket.

12. A front suspension system as recited in claim 1 wherein the lower bracket is of one piece construction, with substantially flat top and bottom surfaces.

13. A front suspension system as claimed in claim 1 wherein the lower bracket is aluminum.

14. A front suspension system as recited in claim 1 wherein the lower bracket is attached to each of the rear forks by means of a pinch compression connection.

15. A front suspension system as recited in claim 1 wherein the lower bracket is attached to the rear forks so that said forks are mounted in a single plane.

16. A front suspension system as recited in claim 1 wherein the upper bracket includes a pair of countersunk portions for receiving the upper end of each rear fork.

17. A front suspension system as recited in claim 1 wherein the lower bracket includes two pairs of spaced apart annular countersunk circular regions for aligning the upper and lower springs, the first pair of circular regions including a circular cut-out in the top surface of the bracket in registry with a circular cut-out region in a lower surface of the bracket.

18. A front suspension system as recited in claim 1 additionally comprising an axle and a pair of caliper bracket assemblies, each such caliper bracket assembly being pivotally connected at one end to the rear fork and at the other end to said axle.

19. A front suspension system as recited in claim 18 wherein the front suspension additionally incorporates a pair of hollow cylindrical wheel spacers rotatably mounted on the axle, and wherein each such caliper bracket assembly is mounted for rotational movement on one of said wheel spacers.

20. A front suspension system as recited in claim 19 wherein the caliper bracket assemblies are restrained from movement along the length of each pair of wheel spacers by fasteners which are installed in grooves formed in the wheel spacers on each side of each such caliper bracket assembly.

21. A front suspension system as recited in claim 1 wherein each of said rear forks has a section of cylindrical tubing welded to its bottom end for pivotal connection to the respective rocker arm.

22. A front suspension as recited in claim 21 additionally comprising a bushing having a cylindrical rim around its end is installed in each such tubing section.

23. A front suspension as recited in claim 1 wherein the upper bracket has a retaining bore on each end and each of said rear forks has a bore in its upper end, the retaining bores being in registry with the fork bores, and wherein the suspension system also includes a retaining fastener having one end inserted through the retaining bore and into the fork bore to thereby couple the upper bracket to the fork and a second end for connection to the end of a steering rod.

24. A front suspension system for use with a motorized trike having a frame, the suspension system comprising:

a pair of spaced apart and generally parallel rear forks, each extending between an upper end and a lower end;

an upper bracket connecting the upper end of each rear fork and adapted for pivotal connection with the frame;

a lower bracket attached to the rear forks and adapted for pivotal connection with the frame;

a pair of rocker arms, each being pivotally mounted to the lower end of one of the rear forks and extending forwardly to an axle bore, the axle bore adapted for connection with a front wheel;

a pair of spaced apart and generally parallel front forks, each pivotally attached to one of the rocker arms between the respective front fork and the axle bore and extending upwardly and generally parallel to the rear forks;

a pair of tubular front fork rods, each being connected at one end to one of the front forks and extending slidably through said lower bracket in parallel alignment with the respective front fork;

a spring, shock, and fender support bracket attached to each of said front forks between said rocker arms and said lower bracket;

a pair of upper springs, each being supported about a respective fork rod between an upper end of the fork rod and the lower bracket, the upper springs being normally maintained in compression such that an outward force is exerted separating the upper end of the fork rods and the lower bracket; and a pair of lower springs, each being supported along a respective front fork between the lower bracket and the spring support bracket, each lower spring being normally maintained in compression such that an outward force is exerted separating the spring support bracket and the lower bracket; and wherein the front forks are movable relative to the rear forks in response to pivotal movement of the rocker arms and wherein the fork movement is restrained by the lower springs and the opposing upper springs.

25. A front suspension as recited in claim 24 wherein the lower bracket further comprises a pair of spaced apart rod bushings, each adapted for slidably supporting the axial movement of each fork rod.

26. The front suspension as recited in claim 24 and further comprising a pair spaced apart steering linkages, each linkage being pivotally coupled to the upper bracket and concentric with a respective front fork.

27. A front suspension as recited in claim 24 wherein the upper bracket and the spaced apart lower bracket each comprises a concentric stem bore for pivotal connection with a frame stem and wherein each of said stem bores is spaced between the rear forks.

28. A front suspension as recited in claim 27 wherein the stem bores are concentric with an axis positioned forward and generally parallel to a longitudinal axis of the rear forks for creating a negative trailing action.

29. A front suspension as recited in claim 28 wherein the axis concentric with the stem bores is between approximately 0.5 and 3.5 inches forward of the axis of the rear forks.

30. A front suspension system as recited in claim 24 wherein the lower bracket is of one piece construction, with substantially flat top and bottom surfaces.

31. A front suspension system as is claimed in claim 24 wherein the lower bracket is aluminum.

32. A front suspension system as recited in claim 24 wherein the lower bracket is attached to the rear forks by means of a pinch compression connection.

33. A front suspension system as recited in claim 24 wherein the lower bracket is connected to the rear forks so that the rear forks are mounted in a single plane.

34. A front suspension system as recited in claim 24 wherein the upper bracket includes a pair of countersunk portions for receiving the upper end of each rear fork.

35. A front suspension system as recited in claim 24 wherein the lower bracket includes two pairs of spaced apart annular countersunk circular regions for aligning the upper and lower springs, the first pair of circular regions including a circular cut-out in the top surface of the bracket in registry with a circular cut-out region in a lower surface of the bracket.

36. A front suspension system as recited in claim 24 additionally comprising an axle and a pair of caliper bracket assemblies, each such caliper bracket assembly being pivotally connected at one end to the rear fork and at the other end to said axle.

37. A front suspension system as recited in claim 36 wherein the front suspension additionally incorporates a pair of hollow cylindrical wheel spacers rotatably mounted on the axle, and wherein each such caliper bracket assembly is mounted for rotational movement on one of said wheel spacers.

38. A front suspension system as recited in claim 37 wherein the caliper bracket assemblies are restrained from movement along the length of each pair of wheel spacers by fasteners which are installed in grooves formed in the wheel spacers on each side of each such caliper bracket assembly.

39. A front suspension system as recited in claim 24 wherein each of said rear forks has a section of cylindrical tubing welded to its bottom end for pivotal connection to the respective rocker arm.

40. A front suspension as recited in claim 39 additionally comprising a bushing having a cylindrical rim around its end is installed in each such tubing section.

41. A front suspension as recited in claim 24 wherein the upper bracket has a retaining bore on each end and each of said rear forks has a bore in its upper end, the retaining bores being in registry with the fork bores, and wherein the suspension system also includes a retaining fastener having one end inserted through the retaining bore and into the fork bore to thereby couple the upper bracket to the fork and a second end for connection to the end of a steering rod.

* * * * *